Aug. 18, 1964

F. KOHLER 3,145,285

AUTOMATIC TEMPERATURE CONTROL FOR WELDING APPARATUS

Filed June 19, 1963

Aug. 18, 1964 F. KOHLER 3,145,285
AUTOMATIC TEMPERATURE CONTROL FOR WELDING APPARATUS
Filed June 19, 1963 2 Sheets-Sheet 2

3,145,285
AUTOMATIC TEMPERATURE CONTROL FOR
WELDING APPARATUS
Fred Kohler, New York, N.Y., assignor to American
Machine & Foundry Company, New York, N.Y., a corporation of New Jersey
Filed June 19, 1963, Ser. No. 289,073
9 Claims. (Cl. 219—59)

This invention relates to apparatus for maintaining substantially constant the temperature of portions of an object being heated, while moving, with electrical fields or currents and is particularly useful in controlling the temperature of parts being welded together electrically.

Although the invention has application to other uses, it will be described herein as applied to the welding together of metal parts which are supplied with high frequency electric heating currents as they are moved along a predetermined path, either continuously or intermittently, past the means for supplying the currents, such as sliding or rolling contacts or an induction coil.

In the welding together of metal parts, such as the edges or edge portions of a metal tube which are to be fluid impervious after welding, it is highly desirable to maintain the temperature of the portions being joined within a relatively narrow welding temperature range. When the parts are being moved with respect to a source of heating currents, the temperature of the parts will vary not only with the magnitude of the current supplied but also with the speed of movement, a slower speed producing a higher temperature and vice versa with a fixed amount of current.

Of course, if the current and speed could be maintained constant, then the temperature will be substantially constant. However, for various reasons, including slippage between the driving means and the parts, speed variations of the driving means and the need at times to vary the speed of movement because of delays in other, succeeding manufacturing operations being performed on the parts, the speed of movement of the parts will increase or decrease from the normal value from time to time and at varying rates. Fixed amounts of or long time variations in speed can be compensated for manually, but the random variations occurring irregularly cannot be so compensated for. In addition, it is desirable to compensate automatically for predetermined speed variations of limited range.

While direct measurement of the actual temperature of the parts would provide information which would permit compensation by adjustment of the heating currents, it has been found that as a practical matter several problems exist under normal welding conditions which prevent accurate measurement of the temperature. For example, there is smoke, scale on the parts, vibration, solvent, lubricant and coolant spray, changing ambient light and temperature conditions, etc.

It is relatively easy to obtain accurate measurements of the current supplied to the parts and of the speed at which the parts are being moved, and it has been found by tests that satisfactory control of the welding temperature can be obtained if the welding current is automatically increased when the speed is increased and vice versa in a non-linear, decreasing rate of change relation. Theoretically, since the heating power in the parts is the square of the current times the resistance of the parts, and the resistance of the parts is substantially constant for a given material and size, then the current should be proportional to the square root of the speed. However, even when the parts are stationary, a minimum power is required so that the relationship between current and speed may be expressed as follows:

(1) $$I^2 R = A + K_1 S$$

or (2) $$I = K_2(A + K_1 S)^{1/2}$$

where

I is the heating current
$K_1$ and $K_2$ are constants
A is the heating current require for welding at zero speed
S is the speed of movement of the parts While the foregoing theoretical relationship between current and speed is non-linear, the current being proportional to the square root of a constant plus the speed, there are other factors, such as variation of radiation rate, electrode resistance, coolant effectiveness, etc., which also vary with speed so that the relationship between current and speed may depart from the relationship expressed by Formulas 1 and 2 above.

In accordance with my invention, I provide a method for controlling the temperature of an object being heated by electric currents which comprises varying the current in the object in a non-linear, decreasing rate of change relation with respect to the speed of movement of the object, the current being increased with an increase in speed and vice versa. Also in accordance with my invention, I provide apparatus for automatically carrying out said method, which apparatus may be adjusted to vary the relationship between current changes with speed to satisfy varying conditions which may be encountered in practice.

In accordance with the preferred embodiment of the apparatus of the invention, a voltage is generated which is proportional to the speed of movement of the parts being heated, such voltage is combined with a voltage corresponding to the factor A in Formula 2 above, the combined voltages are applied to a non-linear or square root network, the combined voltages modified by such network are compared with a voltage proportional to the current flowing in the object being heated and the compared voltages are employed to operate a servo or control system which controls the amount of current flowing in the object being heated.

One of the objects of the invention is to provide simple and reliable apparatus for automatically controlling the temperature of parts being heated electrically within predetermined limits.

Another object of the invention is to provide automatic apparatus which will control the heating of parts being electrically welded so as to produce improved, more uniform welds.

Other objects and advantages of the invention will be apparent from the following detailed description of the preferred embodiments thereof, which description should be considered in conjunction with the accompanying drawings in which.

Figure 1:
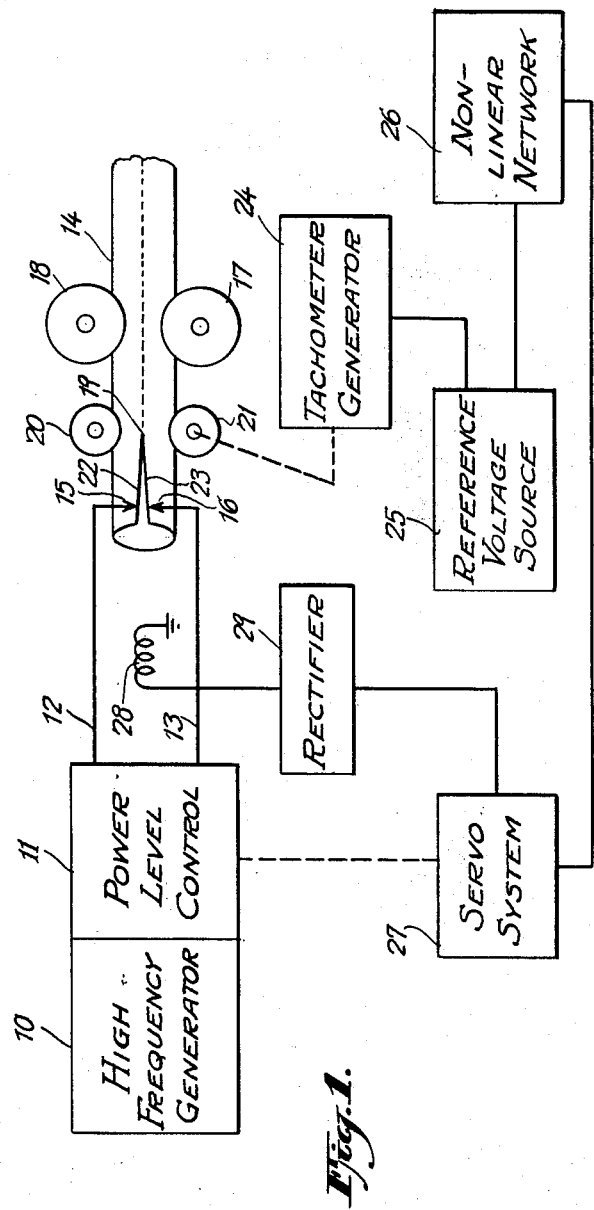
FIG. 1 is a block diagram illustrating an embodiment of the apparatus of the invention.

FIG. 1 illustrates one embodiment of the invention as used in conjunction with high frequency electrical tube welding apparatus of the type shown and described in U.S. Patent No. 2,818,488. Such apparatus comprises a high frequency generator 10, a power level control 11, and a pair of leads or transmission line 12 and 13 which convey the currents to edge portions of the tube 14. The currents may be applied to the tube 14 by a pair of contacts 15 and 16 or may be induced in the tube by an induction coil surrounding the tube 14 as shown and described in U.S. Patent No. 3,037,105 or in any other known manner. The tube 14 is driven to the right as viewed in FIG. 1 by a pair of driven rollers 17 and 18 and the tube may be formed from skelp, the edge portions 22 and 23 of which are brought close to each other below the contacts 15 and 16 and which are then forced together after being heated to welding temperature at the weld point 19 by means of rollers 20 and 21. Whether supplied to the tube 14 by contacts 15 and 16 or an induction coil, the current flows from the points at which the current is supplied, such as at the contacts 15 and 16, and along the edge portions 22 and 23 to and from the weld point 19.

The controlling apparatus of the invention comprises a generator 24 which may be a conventional tachometer generator of either the A.C. or D.C. output voltage type which is driven in synchronism with the movement of the tube 14. Thus, the generator 24 may be mechanically coupled to one of the rollers 20 and 21 which normally are idler rollers or to one of the driven rollers 17 and 18. Preferably, it is connected to an idler roller so as to eliminate errors due to slippage between a driven roller and the tube 14.

The output voltage of the generator 24 is combined with a reference voltage from the source 25 and the combined voltages are applied to a non-linear network 26. The network 26 modifies the voltages applied thereto so that the output voltage of the network 26 varies in accordance with the right hand terms of Equation 1 or 2 above, and such output voltage is supplied to a well known servo system 27.

A voltage related in magnitude, preferably linearly related, to the amount of current flowing in the tube 14 is also supplied to the servo system 27 so as to control the power level control 11 in accordance with the sign and magnitude of the difference between the output voltage of the network 26 and the voltage related in magnitude to the current of the tube 14. Such latter voltage may, in a high frequency heating system, be obtained by means of a pick-up coil 28 located adjacent one of the leads 12 and 13, the pick-up coil 28 being connected to a rectifier 29, the output of which is connected to the servo system 27. However, it will be apparent to those skilled in the art that a voltage related to the magnitude of the heating current may be obtained in other ways.

Figure 3:
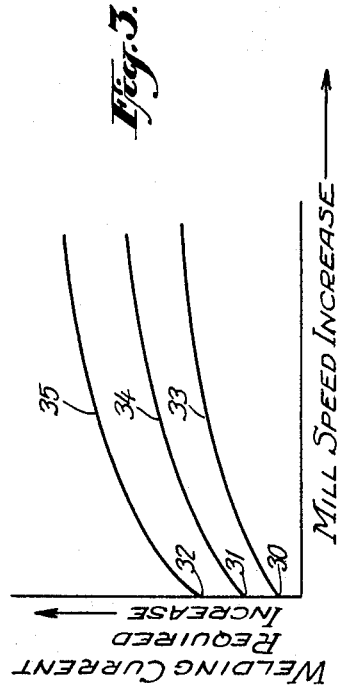
FIG. 3 is a graph illustrating the relationship between welding current and tube speed in a tube welding mill.

FIG. 3 illustrates the relationship between tubing or welding speed and welding current which may be obtained with the apparatus illustrated in FIG. 1. The initial points 30, 31 and 32 of the curves 33, 34 and 35, respectively, may be set by means of the magnitude of the reference voltage supplied by the source 25. The non-linear curvature of the curves 33–35 may be obtained by means of the non-linear network 26, and it will be noted that the curves 33–35 have a decreasing rate of change with increases in mill or welding speed. Thus, as the speed of movement of the tubing 14 increases, there is an increase in the magnitude of the welding current and vice versa, but the increase in welding current is not directly proportional to the tubing speed for the reasons heretofore explained. In most cases, it is sufficient for the welding current to vary in accordance with the square root of the tubing or welding speed, plus a constant, but as explained above, the shape of the curve may be modified by adjustment of the network 62 to meet the requirements encountered in practice.

Referring again to FIG. 1, the speed of movement of the tube 14 and the power level control 11 may be adjusted manually by the usual controls (not shown) to obtain the proper welding current for a predetermined welding speed. The controls of the servo system 27, the reference voltage source 25 and the non-linear network 26 are then adjusted to maintain the desired welding temperature at the weld point 19 with varying tubing or welding speeds and thereafter, the control system will maintain the welding temperature at the desired value with different speeds of movement of the tube 14. Thus, if the speed of movement of the tubing 14 increases, the output voltage of the generator 24 increases which causes an increase of the voltage supplied to the servo system 27 by the network 26. The servo system 27 will thereby become unbalanced causing it to operate the power level control 11 to increase the current supplied to the tube 14 until the voltage delivered at the output of the rectifier 29 to the servo system 27 is sufficient to balance the servo system and thereby discontinue adjustment of the power level control 11.

Similarly, if the speed of movement of the tube 14 decreases, the servo system 27 will again become unbalanced in the opposite direction, causing it to operate the power level control 11 and thereby reduce the amount of current supplied to the tubing 14.

Figure 2:
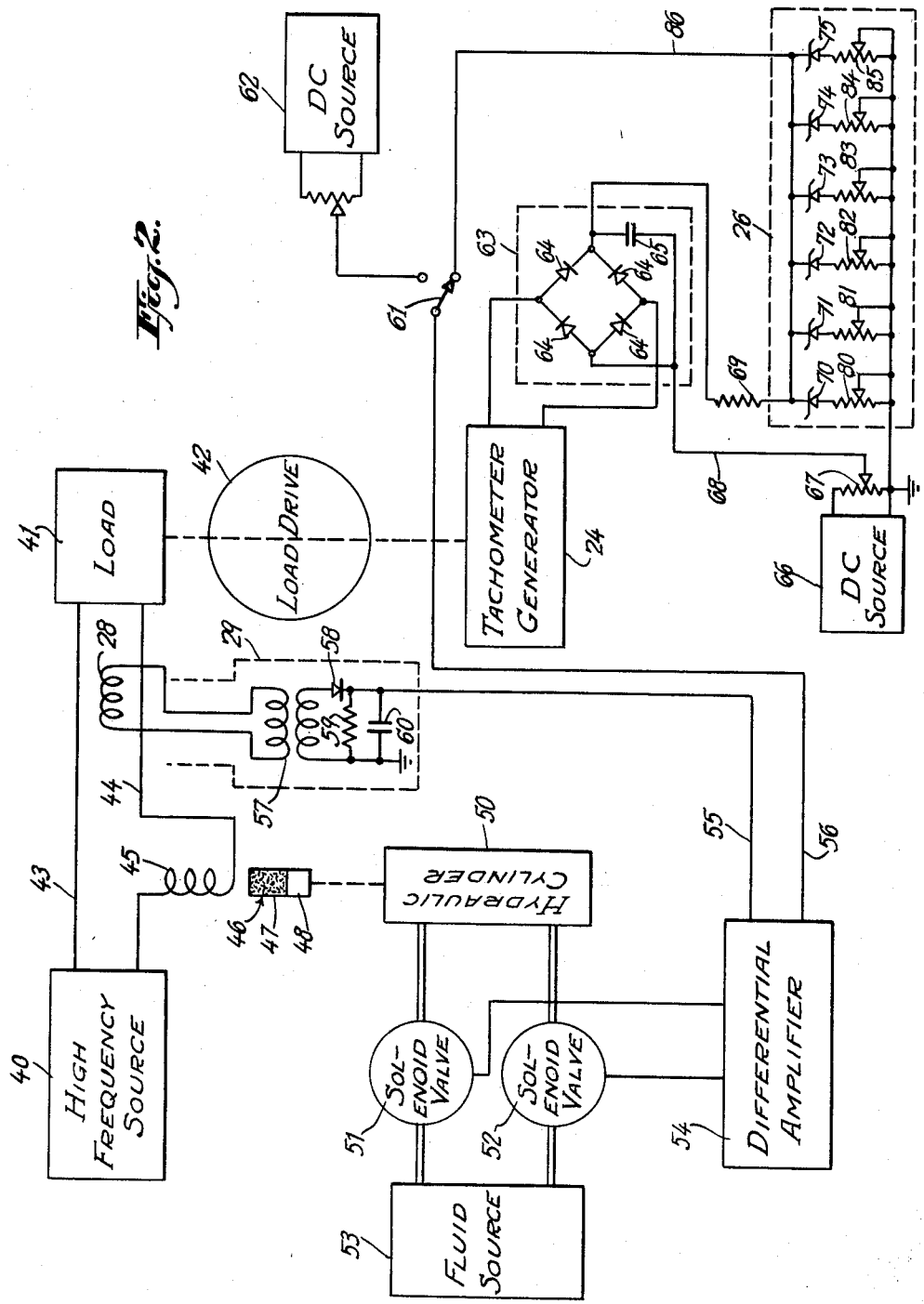
FIG. 2 is a partly schematic, block diagram illustrating an embodiment of the apparatus of the invention.

FIG. 2 illustrates a preferred embodiment of the invention in greater detail and shows a high frequency source 40 connected to a load 41, such as metal parts to be heated or welded, which load is movable by a conventional drive 42. The load 41 is electrically connected to the source 40 by leads 43 and 44, the lead 44 having in series therewith, an inductor 45 which is adjustable by means of a core 46 having a magnetic portion 47 and a highly conductive portion 48. The adjustable inductor 45 may be of the type described and illustrated in U.S. Patent No. 2,856,499. As the core 46 is varied in position with respect to the inductor 45, it varies the impedance of the inductor 45, thereby varying the amount of current supplied to the load 41.

The core 46 is adjusted in position by hydraulic piston and cylinder means 50, the piston of which is reciprocally movable under control of the solenoid valves 51 and 52 which control the supply of fluid to the cylinder 50 from the source of fluid under pressure 53.

The solenoid valves 51 and 52 are alternately operable by the output of a well known type of differential amplifier 54 which supplies an operating voltage to the valve 51 or the valve 52, depending upon the relative magnitudes of the voltages supplied at the input leads 55 and 56.

The pick-up coil 28 is connected to a conventional rectifier 29 comprising a transformer 57, a rectifying element 58, a resistor 59 and a capacitor 60. The output of the rectifier 29 is connected to the differential amplifier 54 by means of the lead 55.

The lead 56 may be connected by means of a switch 61 to either a variable output D.C. source 62 or the output of the non-linear network 26. The purpose of the D.C. source 62 is to permit manual adjustment of the position of the core 46 and hence, manual adjustment of the current supplied to the load 41.

When the switch 61 connects the lead 56 to the output of the non-linear network 26, the current supplied to the load 41 is adjusted in non-linear relation to the speed of movement of the load in the manner described above in connection with FIG. 1.

Preferably, the generator 24 is an alternating current generator because of the larger speed range capacity thereof, and the output thereof may be rectified in a rectifier 63 comprising bridge connected rectifying elements 64 and a capacitor 65. The D.C. source 66, shown in FIG. 2, corresponds to the reference voltage source 25 of FIG. 1, and its output voltage is variable by means of a potentiometer 67. The potentiometer 67 is connected in series with the rectifier 63 by a lead 68 and the combined voltages are supplied to the input of the non-linear network 26 through a resistor 69.

Although many forms of non-linear networks are well known in the art, a preferred form of such a network comprises a plurality of elements 70–75, such as Zener diodes, which conduct at different voltage levels. Such elements are shown in FIG. 2 as connected in series with variable resistors 80–85 which may be adjusted to control the shape of the curves 33–35, shown in FIG. 3. For example, element 70 may be selected so as to conduct at a relatively low voltage level and the elements 71–75 may be selected so as to conduct at successively higher voltage levels. By adjustment of the resistors 80–85, the amount of current flowing through the elements 70–75 after conduction may be controlled. In this manner, the output voltage of the network 26 supplied to the lead 86 may be adjusted to predetermined selected values for predetermined values of the input voltage to the network 26.

The control apparatus of the invention is rapid in operation being limited in speed of response primarily by the inertia of the servo system. However, although the control apparatus of the invention may be employed in heating or welding processes in which the heating current is supplied to the parts being heated or welded at the portion thereof at which the desired temperature is to be obtained, such as at the weld point, it will be apparent that due to inertia of the control apparatus and the delay between the change in current and the variation in temperature of the part, such portion in such a process will have moved from the heating position at the time that the current change is effective. Accordingly, the control apparatus of the invention is particularly applicable to a process such as that shown in FIG. 1 in which the heating currents are supplied to the parts being heated in advance of the position at which the desired temperature is to be obtained. Thus, in the arrangement shown in FIG. 1, the parts are subjected to the changed current for a short period of time before reaching the point at which they are welded together and, therefore, the control apparatus of the invention permits more accurate control of the temperature at the point at which the parts are welded together in the welding arrangement illustrated in FIG. 1.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended hereto.

What is claimed as new and desired to be secured by Letters Patent is:

1. Means for welding together the edge portions of metal strip comprising means for moving said edge portions along a predetermined path in side-by-side but separated relation, means for forcing said portions together at a weld point, means for supplying high frequency electrical currents to said edge portions at points in advance of said weld point, whereby the current flows from one of said points along an edge portion to the weld point and from said weld point along the other edge portion to the other of said points and means controlled by the speed of movement of said edge portions for increasing said currents in non-linear, decreasing rate of change relation to increases in said speed.

2. Means for welding together the edge portions of metal strip comprising means for moving said edge portions along a predetermined path in side-by-side but separated relation, means for forcing said portions together at a weld point, means for supplying high frequency electrical currents to said edge portions at points in advance of said weld point, whereby the current flows from one of said points along an edge portion to the weld point and from said weld point along the other edge portion to the other of said points, current control means for increasing and decreasing said currents, speed responsive means controlled by the speed of movement of said edge portions, current responsive means controlled by said currents, and means controlled by said speed responsive means and said current responsive means and connected to said current control means for increasing and decreasing said current in non-linear relation to increases and decreases respectively of said speed.

3. Means for welding together the edge portions of metal strip comprising means for moving said edge portions along a predetermined path in side-by-side but separated relation, means for forcing said portions together at a weld point, means for suplying high frequency electrical currents to said edge portions at points in advance of said weld point, whereby the current flows from one of said points along an edge portion to the weld point and from said weld point along the other edge portion to the other of said points, current control means for increasing and decreasing said currents, current responsive means controlled by said currents for providing a first voltage related to the magnitude of said currents, means for providing a second voltage related to the speed of said edge portions, means for providing a third voltage of substantially constant magnitude, non-linear circuit means connected to said two last-mentioned means for combining said second and third voltages and providing a fourth voltage which is a non-linear function of the combined second and third voltages, a servo system connected to said combining means and said current responsive means and controlled by said first and fourth voltages and connected to said current control means for increasing and decreasing said currents with increases and decreases respectively of the speed of said edge portions.

4. Means for heating an object to a predetermined temperature comprising means for moving said object along a predetermined path, means for supplying electrical current to said object as it moves along said path, means for varying the magnitude of said current, means for providing a first voltage related to the magnitude of said current, means for providing a second voltage related to the speed of said object, means for providing a third voltage of substantially constant magnitude, means for combining said second and third voltages and providing a fourth voltage which is a non-linear function of the combined second and third voltages, means for comparing said first and fourth voltages and controlled by the difference therebetween and means interconnecting said comparing means and said current magnitude varying means for varying the magnitude of said current by said comparing means.

5. Means for heating an object to a predetermined temperature comprising means for moving said object along a predetermined path, means for supplying electrical current to said object as it moves along said path, means for varying the magnitude of said current, means for providing a first voltage related to the magnitude of said current, means for providing a second voltage related to the speed of said object, means for providing a third voltage of substantially constant magnitude, means for combining said second and third voltages and providing a fourth voltage which is a function of the square root of the combined second and third voltages, means for comparing said first and fourth voltages and controlled by the difference therebetween and means interconnecting said comparing means and said current magnitude varying means for varying the magnitude of said current by said comparing means.

6. Means for heating an object to a predetermined temperature comprising means for moving said object along a predetermined path, means for supplying electrical current to said object as it moves along said path, means for varying the magnitude of said current, means for providing a first voltage related to the magnitude of said current, means for providing a second voltage related to the speed of said object, means for providing a third voltage of substantially constant magnitude, means for combining said second and third voltages and providing a fourth voltage which is a non-linear function of the combined second and third voltages, said fourth voltage increasing with increases of said second voltage but having a decreasing rate of change in relation to said first voltage, means for comparing said second and fourth voltages and controlled by the difference therebetween and means interconnecting said comparing means and said current magnitude varying means for varying the magnitude of said current by said comparing means.

7. Means for welding together the edge portions of a metal strip to form tubing comprising means including driving means for moving said edge portions along a predetermined path in side-by-side but separated relation, means for forcing said portions together at a weld point, means for supplying high frequency electrical currents to said edge portions at points in advance of said weld point, whereby the current flows from one of said points along an edge portion to the weld point and from said weld point along the other edge portion to the other of said points, current control means for increasing and decreasing said currents, current responsive means coupled to said supplying means for providing a first voltage variable in magnitude with the magnitude of said currents, a generator driven in synchronism with said strip for providing a second voltage variable in magnitude with the speed of movement of said strip, a reference voltage source, a non-linear circuit having an input and an output and comprising a plurality of voltage responsive circuits connected in parallel with each other and with said input and said output, means connecting said voltage source and said generator to said input, and servo means having an output connected to said current control means and having inputs connected to said current responsive means and to said output of said non-linear circuit, said servo means being responsive to said first voltage and the output voltage of said non-linear circuit for operating said current control means in a direction to increase said currents when the speed of movement of said strip increases and vice versa.

8. Means for welding together the edge portions of a metal strip to form tubing comprising means including driving means for moving said edge portions along a predetermined path in side-by-side but separated relation, means for forcing said portions together at a weld point, means for supplying high frequency electrical currents to said edge portions at points in advance of said weld point, whereby the current flows from one of said points along an edge portion to the weld point and from said weld point along the other edge portion to the other of said points, current control means for increasing and decreasing said currents, current responsive means coupled to said supplying means for providing a first voltage variable in magnitude with the magnitude of said currents, an alternating current generator connected to and driven by one of said driving and forcing means, a rectifier connected to the output of said generator for providing a second voltage variable in magnitude with the speed of movement of said strip, a variable direct current voltage source, a non-linear circuit having an input and an output and comprising a plurality of voltage responsive circuits connected in parallel with each other and with said input and said output, each of said circuits comprising a voltage responsive element connected in series with a variable resistor and each element having a different voltage response level, means connecting said voltage source and said rectifier in series with each other and to said input, and servo means having an output connected to said current control means and having inputs connected to said current responsive means and to said output of said non-linear circuit, said servo means being responsive to said first voltage and the output voltage of said non-linear circuit for operating said current control means in a direction to increase said currents when the speed of movement of said edge portions increases and vice versa.

9. Means for welding together the edge portions of a metal strip to form tubing comprising means including driving means for moving said edge portions along a predetermined path in side-by-side but separated relation, means for forcing said portions together at a weld point and rotatable by said strip, means for supplying high frequency electrical currents to said edge portions at points in advance of said weld point, whereby the current flows from one of said points along an edge portion to the weld point and from said weld point along the other edge portion to the other of said points, current control means for increasing and decreasing said currents, current responsive means coupled to said supplying means for providing a first voltage variable in magnitude with the magnitude of said currents, an alternating current generator connected to and driven by said forcing means, a rectifier connected to the output of said generator for providing a second voltage variable in magnitude with the speed of movement of said strip, a variable direct current voltage source, a non-linear circuit having an input and an output and comprising a plurality of voltage responsive circuits connected in parallel with each other and with said input and said output, each of said circuits comprising a Zener diode connected in series with a variable resistor and each diode having a different voltage response level, means connecting said voltage source and said rectifier in series with each other and to said input, and servo means having an output connected to said current control means and having inputs connected to said current responsive means and to said output of said non-linear circuit, said servo means being responsive to said first voltage and the output voltage of said non-linear circuit for operating said current control means in a direction to increase said currents when said last-mentioned output voltage exceeds said first voltage and vice versa.

References Cited in the file of this patent

UNITED STATES PATENTS

| | | |
|---|---|---|
| 1,212,869 | Woodrow | Jan. 16, 1917 |
| 2,819,369 | Dexter | Jan. 7, 1958 |